United States Patent [19]

Petitcollin et al.

[11] Patent Number: 4,793,466
[45] Date of Patent: Dec. 27, 1988

[54] DEVICE FOR DETECTING A SHEET OF GLASS

[75] Inventors: Jean-Marc Petitcollin, Thourotte; Francis Perin, Nevers, both of France

[73] Assignee: Saint-Gobain Recherche, Aubervilliers, France

[21] Appl. No.: 907,789

[22] Filed: Sep. 16, 1986

[30] Foreign Application Priority Data

Sep. 18, 1985 [FR] France ............... 85 13801

[51] Int. Cl.⁴ ............... B65G 43/08; B65G 13/02
[52] U.S. Cl. ............... 198/502.3; 198/781
[58] Field of Search ............... 198/502.1, 781, 463.4, 198/464.2, 502.3, 572, 857; 271/227, 265

[56] References Cited

U.S. PATENT DOCUMENTS

| | | | |
|---|---|---|---|
| Re. 30,791 | 11/1981 | Kupcikevicius | 198/857 X |
| 3,762,533 | 10/1973 | Giles | 198/781 X |
| 4,108,304 | 8/1978 | McKnight et al. | 198/781 |
| 4,136,766 | 1/1979 | Pryor et al. | 198/463.4 X |
| 4,212,385 | 7/1980 | Leach | 198/781 |
| 4,609,098 | 9/1986 | Morgan et al. | 198/781 |

FOREIGN PATENT DOCUMENTS

| | | | |
|---|---|---|---|
| 54-65969 | 5/1979 | Japan | 271/265 |
| 471139 | 9/1975 | U.S.S.R. | 198/463.4 |

Primary Examiner—Robert J. Spar
Assistant Examiner—P. McCoy Smith
Attorney, Agent, or Firm—Oblon, Fisher, Spivak, McClelland & Maier

[57] ABSTRACT

The invention relates to a device for detecting sheets of glass. An essentially mechanical device constituted by a detector finger which is tilted by the leading edge of a sheet of glass, then concealed by the action of a jack to allow the sheet of glass to pass. The tilting movement is registered by a pick-up located remotely from the conveyor. The invention is directed especially at the detection of sheets of glass being carried inside an enclosed space which is at a high temperature.

5 Claims, 3 Drawing Sheets

DEVICE FOR DETECTING A SHEET OF GLASS

BACKGROUND OF THE INVENTION

1. Field of the Invention

The invention relates to the accurate detection of a moving sheet of glass. It proposes a mechanical device for detecting the fact that a sheet of glass carried on a conveyor has passed a given point The detection device according to the invention is particularly directed at installations for the heat treatment of forming of sheets of glass.

2. Background of the Prior Art

The majority of treatments carried out on sheets of glass can only be performed properly if the glass sheet is located in perfect registry and is stationary at a precise point in the treatment chain.

For instance, in order to give sheets of glass a curvature of given radius, it is usual to heat them individually in a tunnel furnace, transport them on a conveyor and then transfer them from the conveyor to a bending frame or bending press. The trickiest part of this operation is effecting the transfer without making any visible marks or faults on glass which has been raised to its softening temperature.

Many authors have given their attention to improving the transfer means. In all cases, the transfer is carried out in the following successive stages: the sheet of glass which is being transported on a horizontal conveyor is immobilized, then moved vertically by vacuum means and/or raised by a gaseous pressure, after which the bending apparatus is located under the sheet of glass. The sheet of glass then falls—possibly under control—and is then taken over by the said bending apparatus.

A good final positioning of the glass sheet is possible only if its immobilization at the first stage is perfectly controlled, which means that the conveyor has to stop abruptly with the sheet under or, according to the circumstances, above the apparatus which performs the vertical movements of the sheet. To avoid any sliding of the sheet of glass, it is all that part of the conveyor which is above the level of the vertical displacement means which has to be stopped simultaneously. Since on the other hand, even with highly automated units, the sheet processing rate is never perfectly regular, it is necessary to detect the passage of the glass at a point on the conveyor, for instance shortly after the exit from the tunnel furnace, in order to control with an adequate time lag the actual stopping of the conveyor.

The choice of detection system generally falls to devices which entail no material contact between the glass and the detector, so that there is no risk of causing defects. However, the applicants have found that visual detectors are not sufficiently viable under the temperature conditions which obtain in a bending chamber. Indeed, at a temperature of around 700° C., the light rays are considerably diffracted and above all any slight variation in the temperature in the chamber alters the angle of diffraction so that the ray is no longer detected.

Establishing this fact has led to the applicants departing completely from the prior art and propose an essentially mechanical detector which is unaffected by the ambient temperature.

SUMMARY OF THE INVENTION

The detection device according to the invention is a detector finger projecting above the plane of the conveyor along which the sheets of glass are conveyed. When the leading edge of a sheet of glass arrives at the height of the detector finger, the impact produces a tipping or tilting movement of the finger resulting in its retraction and the triggering of its movement is registered by a pickup. Thus it is possible to determine the precise moment when the sheet of glass passes a known point on the conveyor, that is to say perpendicular to the detection device.

Advantageously, the detection device according to the invention is associated with a bed of rollers, possibly curved. In this case, the detector finger is mounted for example on a rod located between two rollers parallel therewith. Preferably, the detector finger is mounted directly on a roller of the conveyor, which is not rigid with the movement of rotation of the other rollers and is driven by the movement of the detector finger.

It should be noted that the invention is nevertheless not limited in its application to the instance of roller conveyors. The detector roller according to the invention can for instance be mounted between two belt conveyors. However, in view of the fact that roller conveyors are those most used in installations for treating sheets of glass raised to a high temperature, only this embodiment will be taken into account in the following detailed description in which reference is made to the appended drawings.

DETAILED DESCRIPTION OF THE PREFERRED EMBODIMENTS

Figure 1:
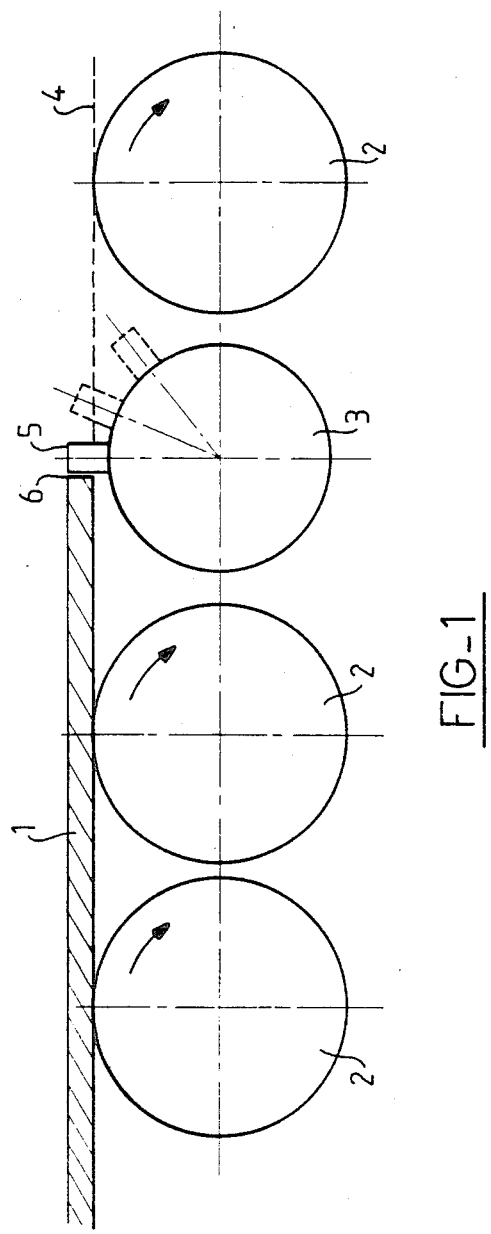
FIG. 1 is a diagrammatic cross-sectional view on the axis of symmetry of the conveyor through a detector roller according to the invention and FIG. 2 is a diagrammatic side view of the detector roller shown in FIG. 1.

The sheet of glass 1, raised for instance to its softening temperature, is carried on a roller bed 2 of which FIG. 1 shows only the part around the detector roller 3. These rollers of the conveyor consist in known manner of a tubular body possibly covered with a sheath of refractory cloth; the rotary drive to the rollers is provided for instance by a metal chain meshing with pinions rigid with the rollers and located at one of the ends of the said rollers. The detector roller 3 is preferably constituted by a tubular body which is not covered with a sheath of refractory material. Its diameter is less than or equal to the diameter of the rollers contributing the conveyor.

The detector roller 3 carries a protrusion 5 which, when it is in the active position, projects above the plane 4 formed by the upper generatrices of the rollers 2. This protrusion 5 consists, for example, of a very small detector finger located at the level of the longitudinal axis of the bed of rollers 2, the point through which all the glass sheets have to pass, whatever their size. Preferably, this protrusion 5 consists of a bar running over the full length of the detector roller 3, and so, whatever the position of the sheet of glass in relation to the rollers, its passage directly over the detector roller is detected. With regard to the height of the finger 5, it is such that the leading edge 6 of the sheet of glass systematically abuts it; consequently, it is preferable to choose fingers f about the same height as the normal thickness of the sheets of glass, in other words about 3 mm.

Figure 2:
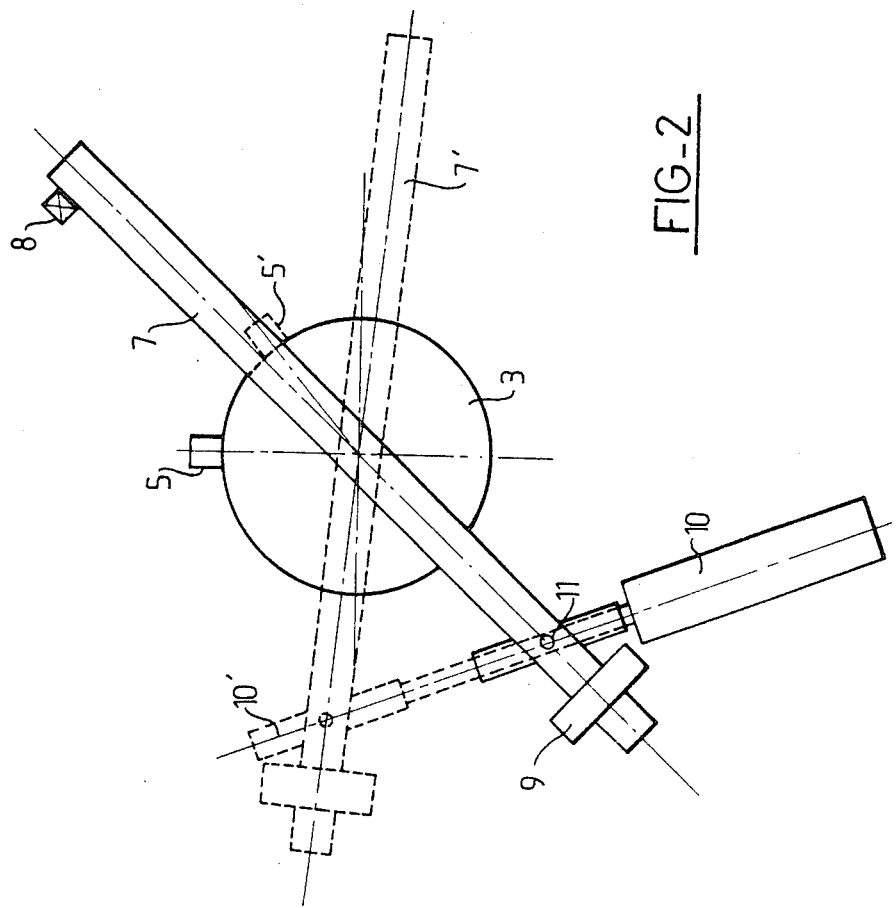

One of the ends of the detector roller 3 is rigid with a lever arm 7 shown in FIG. 2. One of the ends of the lever arm rests on a proximity detector 8, or micro-contact. When the detector roller is in the active position, that is to say when the detector finger is close to intercepting a sheet of glass, the lever arm 7 is weighted at its other end by a balancing counter-weight 9. A jack 10 is articulated on the lever arm at 11.

The device functions in the following way. When the leading edge 6 of the glass sheet 1 strikes the detector finger 5, the impact gives rise to a rotary movement of the detector roller 3, mounted virtually without friction, and in consequence the lever arm moves slightly away from the proximity detector 8. It is clear that this impact between the detector finger 5 and the leading edge of the glass sheet is irremediable and completely independent of the temperature conditions, pressure or nature of the ambient gases. As soon as contact with the detector 8 has ceased, a command is transmitted electrically or pneumatically by the proximity detector, the arm of the return jack 10 is deployed and so the movement of the detector roller 3 is instanteously amplified. The positions of the various elements after this amplified tilting movement are shown by broken lines. The angular divergence between the active position and the tilted position of the detector finger must be such that the detector finger 5, once it is tilted, passes below the plane 4, so that the sheet of glass can continue freely on its way, driven by the rollers of the conveyor 2 situated upstream or downstream of the detector roller. The use of a detector roller without a covering sheath and preferably with a tubular body of a diameter smaller than that of the other rollers eliminates any friction on the sheet of glass. Most preferably, the detector roller has a diameter slightly less than that of the other rollers and, like those, is made of silica. Thus, the detector roller is not deformed at high temperature and is torsionally sufficiently strong to be coupled to the lever arm. Furthermore, this choice makes it possible to mount a system according to the invention on an existing roller conveyor without any substantial modification. Finally, such a roller ensures a permanent supporting of sheets of glass which are excessively heated and which would sag under their own weight.

Only the leading edge of the sheet of glass risks possibly being marked but in view of the fact that this edge is invisible once the glass is set in the window frame, this mark has no effect on the visual quality of the glass.

After a delay corresponding to the minimum of time needed for the whole of the sheet of glass to pass over the detector roller, the jack 10 is deactivated and under the propulsive effect of the balancing counterweight bent back, the detector roller 3 resumes its active position, ready to detect the next sheet.

Thus, cessation of contact with the proximity detector 8 due to the jolt between the leading edge of the sheet of glass and the detector finger 5 zeroes the clock in a control center which, with an appropriate delay, triggers for example stoppage of the conveyor or more precisely of certain rollers thereof, the triggering of the bending operation, for instance the positioning of a negative pressure above the sheet of glass or a flow of gas under the sheet of glass, the lowering of a form of overhead suction, the approach of a bending frame, etc., this list being of course by no means exhaustive.

As indicated above, the return of the detector finger to its active position can according to a first embodiment of the invention to be triggered by the control center from the indication time zero, that is to say from the tilting of the detector finger. According to another embodiment, it is possible to use two detector rollers according to the invention, placed at a distance from each other. In this case, tilting of the detector roller on the upstream side due to passage of the following sheet immediately triggers the return to its active position of the downstream detector roller, the tilting of which itself triggers the return of the upstream detector roller to its active position.

Figure 3:
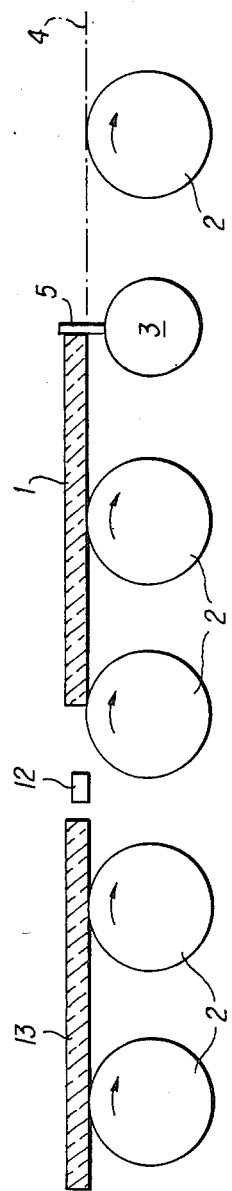
FIG. 3 is a diagrammatic side view of the conveyor of FIG. 1, expanded, to illustrate the passage of two sheets of glass past a photoelectric detector.

Finally, as illustrated in FIG. 3, the return of the detector roller to the active position can also be commanded by an optical detector 12 placed upstream, if possible outside a hot zone or one of which the light rays sweep a large surface so that detection of the presence of the subsequent sheet 13 of glass is assured even if its exact position is not determined.

As the foregoing description shows, the detection system according to the invention comprises solely mechanical elements in the heated chamber. The proximity detector controlling the return jack and the control center are preferably and without any difficulty located outside the heated chamber; thus their operation is not disturbed by the temperature and furthermore they can be replaced at any time.

A great advantage of the detection system according to the invention is that it can be used on any roller conveyor or between two conveyors of any type in an already existing installation without this installation having to undergo any substantial amount of modification.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States:

1. A device for detecting a sheet of glass being carried on a conveyor comprised of a plurality of rollers, said device comprising a detector finger mounted on one of said rollers termed the detector roller, the movement of which is independent of that of the remaining rollers, which said detector finger in its active position projects above the plane of the conveyor, means for retracting the detector finger consisting of a jack articulated on a lever arm, which lever arm connects said detector finger to a proximity detector for registering the movement of the detector finger under the action of the sheet of glass which has been heated to its softening temperature.

2. Detection device according to claim 1, wherein said lever arm is weighted at one end by a balancing counterweight.

3. Detection device according to claim 1, wherein the jack is so mounted that it is activated as soon as the proximity detector picks up a movement of the detector finger, which is thereby instantly retracted, passing into a tilted position, below the plane of passage of the sheets of glass.

4. Detection device according to claim 3, wherein the return of the detector finger to the active position from the tilted position is due to deactivation of the jack controlled by a photoelectric cell placed upstream of the detection device and detecting the passing of a subsequent sheet of glass into its zone of activity.

5. Detection device according to claim 1, wherein said detector roller has a diameter which is smaller than that of the other rollers of the conveyor.

* * * * *